United States Patent [19]

Cassens, Jr.

[11] 4,149,897

[45] Apr. 17, 1979

[54] REFRACTORY COMPOSITION

[75] Inventor: Nicholas Cassens, Jr., Pleasanton, Calif.

[73] Assignee: Kaiser Aluminum & Chemical Corporation, Oakland, Calif.

[21] Appl. No.: 897,232

[22] Filed: Apr. 17, 1978

[51] Int. Cl.² ............................................. C04B 35/04
[52] U.S. Cl. ................................................... 106/58
[58] Field of Search ............................. 106/58, 65, 69

[56] References Cited

U.S. PATENT DOCUMENTS

| | | | |
|---|---|---|---|
| 3,279,933 | 10/1966 | Martinet | 106/58 |
| 3,333,972 | 1/1967 | Elmer et al. | 106/58 |
| 3,351,478 | 11/1967 | Dodson et al. | 106/90 |
| 3,782,984 | 1/1974 | Allemand et al. | 106/90 |
| 3,856,541 | 12/1974 | Martin | 106/90 |

*Primary Examiner*—O. R. Vertiz
*Assistant Examiner*—Mark Bell
*Attorney, Agent, or Firm*—Paul E. Calrow; Malcolm McQuarrie

[57] ABSTRACT

A refractory composition, suitable for ramming, casting, or gunning, which can be heated rapidly without exploding is made from sized refractory aggregate bonded with from 0.1% to 3% $MgSO_4$, from 0.1% to 2% sodium gluconate, and from 0.1 to 2% $B_2O_3$ in the form of a soluble boron compound, boric acid being a preferred form. To inhibit explosion of the composition upon rapid heating, the sum of the per cent sodium gluconate and boric acid should be over 0.8, preferably over 0.9.

8 Claims, No Drawings

REFRACTORY COMPOSITION

BACKGROUND

This invention refers to refractory compositions, particularly compositions suitable for ramming, casting, and gunning.

Such compositions are well known in the art, for example as disclosed in U.S. Pat. No. 3,030,216, which mentions refractory compositions containing fine magnesia, magnesium sulfate, and an organic acid such as acetic, citric, or tartaric, and also mentions the possibility of adding boron compounds to inhibit swelling due to hydration.

However, such prior art compositions have problems, for example the tendency to explode when heated. Although boron compounds have long been added to such compositions to inhibit explosion, they are not always completely successful and there is a continuing search for products which will resist explosion at faster and faster heating rates.

One successful prior art composition is described in U.S. Pat. No. 2,702,751. There the principal bonding agent is chromic acid or a soluble chromate or other chromium compound. However, in recent years there has been increasing concern over the use of potentially hazardous materials such as chromium-containing compounds, especially those which produce $Cr^{+6}$ ions when dissolved in water, and a search has been made for substitute bonds which can be used to make a product having equivalent properties but free of such hazardous substances. U.S. Pat. No. 3,333,972 concerns the use of citric acid in magnesia-containing compositions and mentions the possibility of also including magnesium sulfate and boric acid in such compositions.

The use of sodium gluconate is known in cement compositions, either as a set accelerator, as in U.S. Pat. No. 3,782,984, where it is used in conjunction with alkali metal acid carbonate and alkali metal silicate; or as a cement retarder, as in U.S. Pat. No. 3,351,478, where it is used in conjunction with a soluble sulfate such as sodium, potassium, or ammonium sulfate; or U.S. Pat. No. 3,856,541, where it is used in conjunction with boric acid or a water soluble salt thereof.

Accordingly, the present invention solves the problem of producing an explosion resistant-refractory suitable for ramming, casting, or gunning, and bonded with substances free of soluble chromium.

SUMMARY OF THE INVENTION

It has now been found, according to this invention, that a refractory composition having the desired properties is one which contains (1) from 0.1% to 3% $MgSO_4$ in the form of magnesium sulfate or a compound which will yield magnesium sulfate upon heating to 500° C.; (2) from 0.1% to 2% sodium gluconate; and (3) from 0.1% to 2%, on a $B_2O_3$ basis, of a soluble boron compound, the balance being (4) sized refractory aggregate; the sum of the percent amount of sodium gluconate and percent amount of $B_2O_3$ being over 0.5; all percentages being by weight based on the total weight of the composition.

DETAILED DISCUSSION

Sodium gluconate is a well known material of commerce, and is used in the form of a white granular powder, preferably substantially all passing a 20 mesh screen (i.e., smaller than 0.833 mm) and at least 50% retained on a 100 mesh screen (coarser than 0.147 mm).

The magnesium sulfate may be an anhydrous form of the material, such as calcined magnesium sulfate, or may be one of the hydrated forms such as kieserite, $MgSO_4 \cdot H_2O$, or epsom salts, $MgSO_4 \cdot 7H_2O$. This material is also readily available commercially.

The $B_2O_3$ in the composition may be any soluble boron compound, for example a sodium tetraborate such as the widely available borax, $Na_2B_4O_7 \cdot 10H_2O$. However, a preferred material is boric acid, $H_3BO_3$.

The aggregate used may be any such refractory material, for example calcined fireclay, alumina, silica, and the like. However, a particularly preferred embodiment of the invention uses a basic aggregate, for example periclase. Whatever aggregate is used, it will be sized according to practices well known in the art to achieve the best placed density, for example all passing a ⅜ inch mesh screen (smaller than 9.5 mm) and from 20 to 30% passing a 100 mesh screen (smaller than 0.147 mm).

Compositions of this invention will generally be manufactured by mixing the dry ingredients, including the bonding ingredients, and shipping them to the ultimate user in suitable containers. When the composition is to be used, it will be mixed with the requisite amount of water, which will depend on the particular method of application, and put in place by the user, for example by ramming or casting or gunning. The composition may be used to repair existing structures or it may be used as an original construction material for lining or relining a furnace.

EXAMPLES

Two compositions were made, one (A) with 0.8% calcined magnesium sulfate and the other (B) with 1.4% epsom salts. In addition, each composition contained 0.6% sodium gluconate and 0.7% boric acid, the balance being periclase refractory grain sized so that all passed a 6 mesh screen (smaller than 3.33 mm) and about 20% passed a 325 mesh screen (smaller than 44 microns).

The periclase aggregate had the following typical chemical composition: 1.0% CaO, 2.1% $SiO_2$, 0.4% $Al_2O_3$, 0.4% $Cr_2O_3$, 0.6% $Fe_2O_3$, 0.15% $B_2O_3$, and (by difference) 95.4% MgO. The epsom salts, calcined magnesium sulfate, sodium gluconate, and boric acid were all commercially obtained materials in the form of granular powders.

Different batches were mixed for gunning, ramming, and casting, as described below, the different batches having slightly different sizings of the aggregate depending on the method of application, as will be understood by those skilled in the art.

These different batches were formed by: (a) pressing into pellets 2.25 inches (5.7 cm) in diameter by 3 inches (7.6 cm) high under a pressure of 10,000 psi (703 kg/cm²); (b) ramming into molds to form blocks 9×4.5× about 5 inches (23×11.5×12.7 cm) with a pneumatic rammer; (c) by casting into molds to form blocks 9×4.5× about 6 inches (23 cm×11.5 cm×15.3 cm); and (d) by gunning through a nozzle mix gun onto a cold surface.

The amount of water used in each forming method and the properties of the resultant specimens are indicated in Table I. As background for developing the above preferred compositions (A) and (B), 55 similar compositions, 15 with epsom salts and 40 with calcined magnesium sulfate, were made with varying amounts of the different bond components, ranging from 0 to 1.0% boric acid, from 0 to 0.9% sodium gluconate, from 0.8 to 1.6% epsom salts, and from 0.6 to 1.0% calcined magnesium sulfate. Each of these 55 compositions was tested for explosion tendency by mixing it with 5.75% water and casting into a 1 gallon can which was, after drying at 150° C. for 6 hours, heated to a temperature of 800° C. at a rate of 800° C. per hour and then to 1100° C. at 300° C./hr.

and sodium citrate cracked severely, indicating an explosion tendency.

From these comparison tests it can be seen that the results obtained with sodium gluconate, particularly the explosion resistance, are superior to those obtained with the sodium citrate and citric acid, and that sodium gluconate is not, in the practice of this invention, equivalent to these other organic materials.

In the specification and claims, percentages and parts

TABLE I

|  | Pressed | | | | | | Rammed | | Cast | | Gunned | |
| --- | --- | --- | --- | --- | --- | --- | --- | --- | --- | --- | --- | --- |
|  | A | B | C | D | E | F | A | B | A | B | A | B |
| Composition (%) | | | | | | | | | | | | |
| Sodium Gluconate | 0.6 | 0.6 | | | | | 0.6 | 0.6 | 0.6 | 0.6 | 0.6 | 0.6 |
| Citric Acid | | | 0.6 | 0.6 | | | | | | | | |
| Sodium Citrate | | | | | 0.6 | 0.6 | | | | | | |
| Magnesium Sulfate | 0.8 | | 0.8 | | | 0.8 | 0.8 | | 0.8 | | 0.8 | |
| Epsom Salts | | 1.4 | | 1.4 | | 1.4 | | 1.4 | | 1.4 | | 1.4 |
| H$_2$O Content (%) | 3.75 | 3.75 | 3.75 | 3.75 | 3.75 | 3.75 | 3.25 | 2.75 | 5.5 | 5.0 | Not Determined | |
| Rebound (%) | | | | | | | | | | | 48 | 57 |
| Build Up (in) | | | | | | | | | | | 3-4 | 2-3 |
| (cm) | | | | | | | | | | | 8-10 | 5-8 |
| Bulk Density | | | | | | | | | | | | |
| dried at 150° C. (pcf) | 177 | 179 | 178 | 179 | 177 | 177 | 183 | 182 | 180 | 180 | | |
| (g/cc) | 2.83 | 2.87 | 2.85 | 2.87 | 2.83 | 2.83 | 2.93 | 2.92 | 2.88 | 2.88 | | |
| fired to 1094° C.(pcf) | | | | | | | | | | | 158 | 154 |
| (g/cc) | | | | | | | | | | | 2.53 | 2.47 |
| Porosity (%) | | | | | | | | | | | | |
| Fired to 1094° C. | | | | | | | | | | | 27 | 28 |
| Fired to 1350° C. | | | | | | | 19 | 20 | 19 | 19 | | |
| Cold Crushing Strength | | | | | | | | | | | | |
| Heated to 850° C.-psi | 2823 | 2027 | 2885 | 2453 | 2575 | 2271 | | | | | | |
| -kg/cm$^2$ | 199 | 143 | 203 | 173 | 181 | 160 | | | | | | |
| Fired to 1350° C.-psi | | | | | | | 5123 | 3892 | 1954 | 2279 | | |
| -kg/cm$^2$ | | | | | | | 360 | 274 | 137 | 160 | | |

(This test has been developed as a good laboratory indication of whether or not a castable composition will tend to explode in actual service.) From these 55 tests, it was evident that compositions containing (a) less than 0.1% sodium gluconate or (b) less than 0.2% boric acid (0.1% B$_2$O$_3$) or (c) containing less than a total of 0.8 for the percentages of sodium gluconate plus boric acid, all tended to explode. For best explosion resistance, the total of sodium gluconate plus boric acid should be over 0.9. Conversely, compositions containing at least 0.2% sodium gluconate, at least 0.1% boric acid, and over 0.8 (preferably 0.9) for a total percent of sodium gluconate and boric acid did not explode in this test. In terms of B$_2$O$_3$ the minimum total of sodium gluconate plus B$_2$O$_3$ should be over 0.5.

It will be noted that rammed compositions of this invention had densities after drying at 150° C. substantially the same as pellets pressed at 10,000 psi (703 kg/cm$^2$). Even the cast compositions had only slightly lower densities. Also, compositions (A) and (B) both gunned well, with a relatively wide water range and low dusting. The blocks which had been rammed or cast were soft but had a cohesive character like a stiff putty. This "toughness" is a desirable characteristic.

As comparison compositions, outside the scope of this invention, compositions the same as (A) and (B) were made using 0.6% citric acid (C and D) and 0.6% sodium citrate (E and F) in place of the 0.6% sodium gluconate. When pressed into right cylinders in the same manner as was done with compositions (A) and (B), these comparison compositions had the properties shown in Table I. It can be seen that the properties of the pressed pellets were comparable to those made with sodium gluconate. However, when subjected to the explosion test, the compositions made with citric acid are by weight unless otherwise indicated, except that porosities are expressed in volume percent. Mesh sizes referred to herein are Tyler standard screen sizes which are defined in Chemical Engineers' Handbook, John H. Perry, Editor-in-Chief, Third Edition, 1950, published by McGraw Hill Book Company, at page 963. For example, a 100 mesh screen opening corresponds to 147 microns, and 325 mesh to 44 microns. Analyses of mineral components are reported in the usual manner, expressed as simple oxides, e.g. CaO and SiO$_2$, although the components may actually be present in various combinations, e.g. as a calcium silicate. It will be understood that potassium gluconate and other alkali metal gluconates are equivalent to sodium gluconate.

What is claimed is:

1. A refractory composition consisting essentially of: (1) from 0.1% to 3% MgSO$_4$ in the form of magnesium sulfate or a compound which will yield magnesium sulfate upon heating to 500° C.; (2) from 0.1% to 2% sodium gluconate; and (3) from 0.1% to 2%, on a B$_2$O$_3$ basis, of a soluble boron compound, the balance being (4) sized refractory aggregate; the sum of the percent amount of sodium gluconate and percent amount of B$_2$O$_3$ being over 0.5; all percentages being by weight based on the total weight of the composition.

2. Composition according to claim 1 wherein the refractory aggregate is basic refractory grain.

3. Composition according to claim 2 wherein the basic refractory grain is periclase.

4. Composition according to claims 1, 2, or 3 wherein the B$_2$O$_3$ is present as boric acid and the sum of the percent amount of sodium gluconate and the percent amount of boric acid is at least 0.9.

5. Composition according to claim 4, wherein the magnesium sulfate is calcined magnesium sulfate.

6. Composition according to claim 5 containing about 0.8% calcined magnesium sulfate, about 0.7% boric acid and about 0.6% sodium gluconate.

7. Composition according to claim 4 wherein the magnesium sulfate is epsom salts.

8. Composition according to claim 7 containing about 1.4% epsom salts, about 0.7% boric acid, and about 0.6% sodium gluconate.

* * * * *